United States Patent
McGarel et al.

(10) Patent No.: US 7,638,204 B2
(45) Date of Patent: Dec. 29, 2009

(54) TIER SHEET

(75) Inventors: Owen J. McGarel, Naperville, IL (US); Robert A. Ross, Franklin, TN (US); Ronald R. Schoenberg, Centennial, CO (US); Philip B. LoPresti, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 197 days.

(21) Appl. No.: 11/362,829

(22) Filed: Feb. 28, 2006

(65) Prior Publication Data

US 2007/0202345 A1    Aug. 30, 2007

(51) Int. Cl.
*B32B 27/08* (2006.01)
(52) U.S. Cl. ..................................... 428/515
(58) Field of Classification Search ......... None
See application file for complete search history.

(56) References Cited

U.S. PATENT DOCUMENTS 5,616,420 A * 4/1997 Yamaoka et al. ............ 428/515

* cited by examiner

*Primary Examiner*—Sheeba Ahmed
(74) *Attorney, Agent, or Firm*—Law Offices of Steven W. Weinrieb

(57) ABSTRACT

A new and improved tier sheet comprises a three-layer laminated extrusion comprising outer layers of a suitable polypropylene homopolymer, and an inner core layer comprising a suitable polypropylene copolymer blended with a suitable elastomer selected from the group comprising SANTOPRENE®, KRATON®; ethyl vinyl acetate (EVA), and a thermoplastic olefin (TPO). By effectively incorporating the elastomer into the inner core layer of the three-layer laminated extrusion, the tier sheet is provided with the requisite amount of softness, elasticity, and resiliency so as to not only permit the multiplicity of cans to, in effect, form sufficiently deep impressions or depressions within the upper and lower tier sheets as the different tiers or layers of tier sheets and cans are disposed upon the transportation pallet within the tiered array comprising the palletized load such that movement of the individual cans with respect to the upper and lower tier sheets will effectively be restricted and prevented but, in addition, the tier sheet can dimensionally recover whereby the depressions and impressions will effectively disappear so as to thereby enable each tier sheet to be readied for use with respect to supporting and restraining new or additional sets of cans in connection with the formation of subsequent palletized loads. Furthermore, the outer layers will not readily delaminate from the inner core layer, and still further, the extrusion process results in the fact that the edge portions of the three-layer laminate are effectively sealed such that the three-layer tier sheet laminate will not readily absorb moisture.

15 Claims, 2 Drawing Sheets

TIER SHEET

FIELD OF THE INVENTION

The present invention relates generally to thermoplastic tier sheets which are conventionally employed, for example, for supporting and restraining a multiplicity of empty cans, such as, for example, aluminum cans, wherein the multiplicity of empty aluminum cans are adapted to be disposed in tiered arrays upon a plurality of tier sheets such that the assembly or tiered arrays of the tier sheets and empty aluminum cans can be disposed upon a transportation pallet so as to effectively form a palletized load which is being shipped, for example, from a can manufacturer to a vendor such that the empty cans can be filled with a product, and more particularly to a new and improved thermoplastic tier sheet which is likewise to be employed for supporting and restraining a multiplicity of empty aluminum cans which are adapted to be disposed within tiered arrays upon a plurality of tier sheets such that the assembly or tiered arrays of the tier sheets and empty aluminum cans can be disposed upon a transportation pallet so as to effectively form a palletized load which is being shipped, for example, from a can manufacturer to a vendor such that the empty cans can be filled with a product, wherein the new and improved tier sheet not only exhibits extremely favorable and desirable degrees, properties, characteristics, or qualities of softness, flexibility, elasticity, and resiliency, but in addition, the new and improved tier sheet is manufactured in a unique and novel manner such that the resulting tier sheet will not readily absorb moisture and, in addition, the laminated layers of the new and improved tier sheet will not be subjected to, or experience, delamination.

BACKGROUND OF THE INVENTION

It is known that thermoplastic tier sheets have been conventionally employed, for example, for supporting and restraining a multiplicity of empty cans, such as, for example, aluminum cans, wherein the multiplicity of empty aluminum cans are adapted to be disposed in tiered arrays upon a plurality of tier sheets such that the assembly or tiered arrays of tier sheets and empty aluminum cans can be disposed upon a transportation pallet so as to effectively form a palletized load which is being shipped, for example, from a can manufacturer to a vendor such that the empty cans can be filled with a product. In connection with the manufacture or fabrication of such tier sheets, it is desirable that the tier sheets exhibit predetermined degrees, properties, characteristics, or qualities of softness, flexibility, elasticity, and resiliency in order to in fact serve their useful or desired purposes or objectives. For example, each tier sheet must exhibit a predetermined amount or degree of softness such that the cans can, in effect, form impressions or depressions within the upper and lower tier sheets as the different tiers or layers of tier sheets and cans are disposed upon the transportation pallet within the aforenoted tiered array. As a result of the cans effectively defining impressions or depressions within the upper and lower tier sheets, movement of the individual cans with respect to the upper and lower tier sheets will effectively be restricted and prevented. In addition, the tier sheets need to be sufficiently flexible such that the edges of the tier sheets can bend without experiencing significant deformation during, for example, their disposition and packaging upon the transportation pallets when the palletized loads are being formed. Furthermore, the tier sheets must be sufficiently elastic and resilient whereby, after the cans are removed from the tier sheets, the structure comprising the tier sheets can dimensionally recover such that the depressions and impressions, previously formed within the tier sheets, will effectively disappear so as to thereby enable the tier sheets to be readied for use with respect to new or additional sets of cans in connection with the formation of subsequent palletized loads.

A first conventional, PRIOR ART type of tier sheet, currently being manufactured and marketed, is illustrated in FIG. 1 and is generally indicated by the reference character 10. It is seen that the tier sheet 10 comprises a three-layer laminate structure which comprises a pair of outer layers or members 12,14 which are fabricated from a suitable polypropylene homopolymer, and an inner core layer or member 16 which is fabricated from a suitable polypropylene copolymer. The laminate structure 10 comprises a three-layer extrusion and may have a thickness dimension of approximately 25 mils wherein each one of the outer layers or members 12,14 has a thickness dimension of approximately 1-2 mils. While the tier sheet 10 has proven to be substantially satisfactory, it is desirable that the tier sheet 10 in fact exhibit a greater degree of softness, flexibility, elasticity, and resiliency. As has been noted hereinbefore, it is desired that each tier sheet exhibit a predetermined amount or degree of softness such that the cans can, in effect, form sufficiently large or deep impressions or depressions within the upper and lower tier sheets as the different tiers or layers of tier sheets and cans are disposed upon the transportation pallet within the aforenoted tiered array comprising the palletized load. In this manner, movement of the individual cans with respect to the upper and lower tier sheets will effectively be restricted and prevented.

In addition, each one of the tier sheets 10 needs to be sufficiently flexible such that the edges of the tier sheets can bend without experiencing significant deformation during, for example, their disposition and packaging upon the transportation pallets when the palletized loads are being formed. Furthermore, each one of the tier sheets 100 must be sufficiently elastic and resilient whereby, after the cans are removed from the tier sheets, the laminate structure comprising each tier sheet 10 can dimensionally recover such that the depressions and impressions, previously formed within each tier sheet 10, will effectively disappear so as to thereby enable each tier sheet 10 to be readied for use with respect to supporting and restraining new or additional sets of cans in connection with the formation of subsequent palletized loads.

A second conventional, PRIOR ART type of tier sheet, being currently manufactured and marketed under the trademark TYPAR®, is disclosed within FIG. 2 and is generally indicated by the reference character 110. The second conventional, PRIOR ART tier sheet 110 is also seen to comprise a three-layer laminate structure which comprises a pair of outer layers or members 112,114 which are fabricated from a suitable polypropylene impact copolymer, and an inner core layer or member 116 which is fabricated from a suitable nonwoven polypropylene homopolymer, the three layers or members 112,114,116 being bonded together either by means of a suitable heat-treatment process or by means of a suitable adhesive bonding material. While the second type of tier sheet 110 does exhibit improved softness, flexibility, elasticity, and resiliency properties or operational characteristics, relative to, for example the first type of tier sheet 10 as disclosed within FIG. 1, it is noted that the second type of tier sheet 110 does exhibit some operational or service life disadvantages or drawbacks.

For example, in view of the fact that the three layers or members 112,114,116 of the tier sheet 110 have been bonded together either by means of a suitable heat-treatment process or by means of a suitable adhesive bonding material, the tier sheet 110 can suffer delamination as disclosed within FIG. 3, wherein it is seen, for example, that the upper outer layer or member 112 has effectively become separated from the subassembly comprising the inner core layer or member 116 and the lower outer layer or member 114. Continuing still further, since the inner core layer or member 116 is fabricated from a suitable non-woven polypropylene homopolymer, and in view of the additional fact that the three layers or members 112,114,116 are simply bonded together by means of a suitable heat-treatment process, or by means of a suitable adhesive bonding material, wherein, for example, the exposed edge portions of the tier sheet laminate 110 are not sealed, then the tier sheet 110 will tend to absorb moisture whereby the structural integrity of the tier sheet 110 will, in turn, tend to rapidly deteriorate.

A need therefore exists in the art for a new and improved new and improved tier sheet which therefore not only exhibits extremely favorable and desirable degrees, properties, characteristics, or qualities of softness, flexibility, elasticity, and resiliency, but in addition, the new and improved tier sheet must also be free from the structural drawbacks, defects, or operational disadvantages comprising the absorption of moisture and the delamination of its plurality of layers.

SUMMARY OF THE INVENTION

The foregoing and other objectives are achieved in accordance with the teachings and principles of the present invention through the provision of a new and improved tier sheet which comprises a three-layer laminated extrusion comprising outer layers of a suitable polypropylene homopolymer, and an inner or core layer comprising a suitable polypropylene copolymer blended with a suitable elastomer selected from the group comprising SANTOPRENE®, KRATON®, ethyl vinyl acetate (EVA), and a thermoplastic olefin (TPO). The percentage of the elastomer material, by weight, incorporated within the inner or core layer 216, may vary anywhere within the range of two percent to twenty-five percent (2.00-25.00%). Accordingly, by effectively incorporating the elastomer into the inner or core layer of the three-layer laminated extrusion, the tier sheet is provided with the desired or requisite amount of softness, elasticity, and resiliency so as to permit the multiplicity of cans to, in effect, form sufficiently large or deep impressions or depressions within the upper and lower tier sheets as the different tiers or layers of tier sheets and cans are disposed upon the transportation pallet within the aforenoted tiered array comprising the palletized load such that movement of the individual cans with respect to the upper and lower tier sheets will effectively be restricted and prevented.

In addition, by effectively incorporating the elastomer into the inner or core layer of the three-layer laminated extrusion, the tier sheet is provided with the desired or requisite amount of softness, elasticity, and resiliency such that after the cans are removed from the tier sheets, the laminated structure comprising each tier sheet can dimensionally recover whereby the depressions and impressions, previously formed within each tier sheet, will effectively disappear so as to thereby enable each tier sheet to be readied for use with respect to supporting and restraining new or additional sets of cans in connection with the formation of subsequent palletized loads. Furthermore, as a result of forming the three-layer tier sheet as an integrally formed co-extrusion laminate, the outer layers will not readily delaminate from, or with respect to, the inner or core layer, and still further, in view of the co-extrusion process, the edge portions of the three-layer laminate are effectively sealed such that the three-layer tier sheet laminate will not readily absorb moisture.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
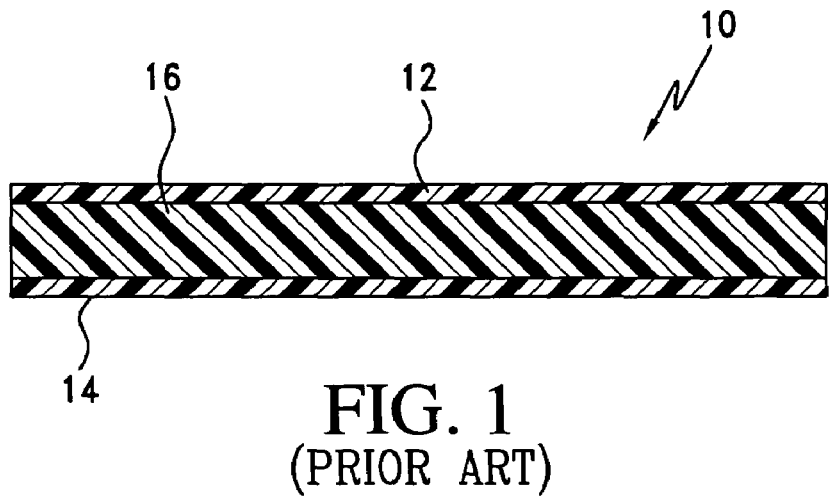
FIG. 1 is a cross-sectional view of a first, conventional PRIOR ART tier sheet which is co-extruded as a three-layer laminate comprising a pair of outer layers which are formed from a suitable polypropylene homopolymer, and a inner or core layer which is formed from a suitable polypropylene copolymer.
Figure 2:
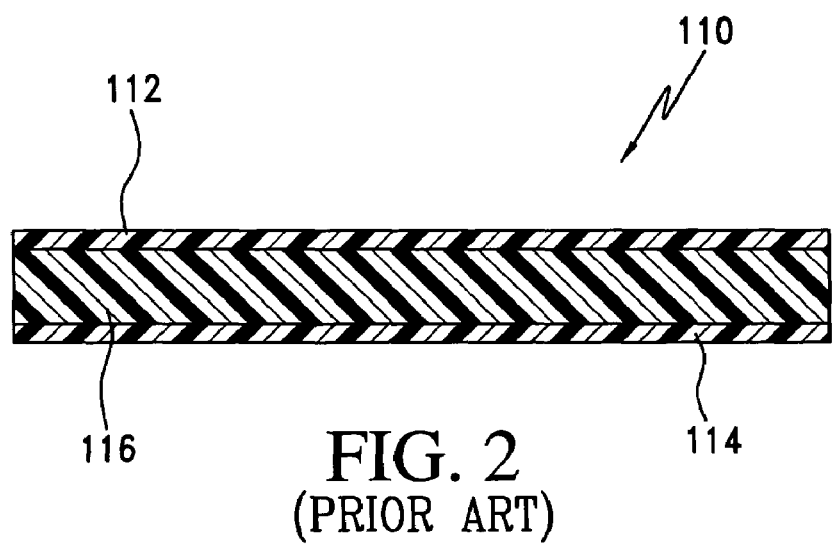
FIG. 2 is a cross-sectional view of a second, conventional PRIOR ART tier sheet which comprises a three-layer laminate comprising an inner or core layer fabricated from a suitable non-woven polypropylene homopolymer to which are bonded a pair of outer layers which are formed from a suitable polypropylene impact copolymer.
Figure 4:
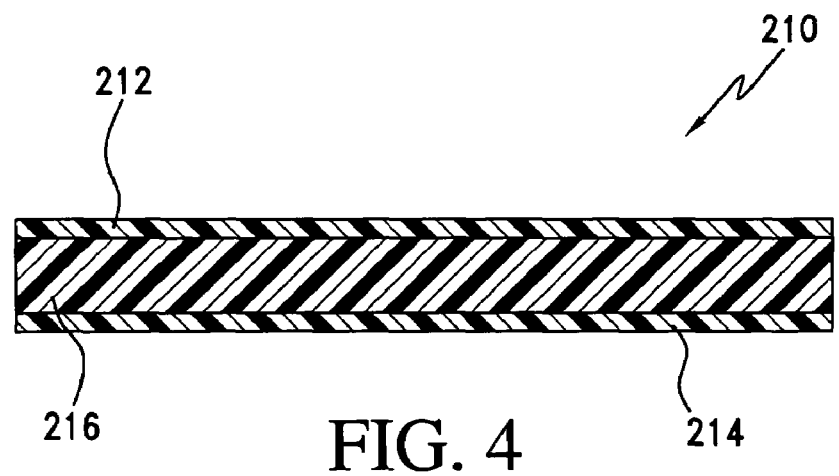
FIG. 4 is a cross-sectional view, similar to those of FIGS. 1 and 2, showing, however, a new and improved tier sheet constructed in accordance with the principles and teachings of the present invention wherein the new and improved tier sheet comprises a co-extruded laminate comprising outer layers fabricated from a suitable polypropylene homopolymer and an inner or core layer fabricated from a suitable polypropylene copolymer blended with a suitable elastomer selected from the group comprising SANTOPRENE®, KRATON®, ethyl vinyl acetate (EVA), and a thermoplastic olefin (TPO).
Figure 3:
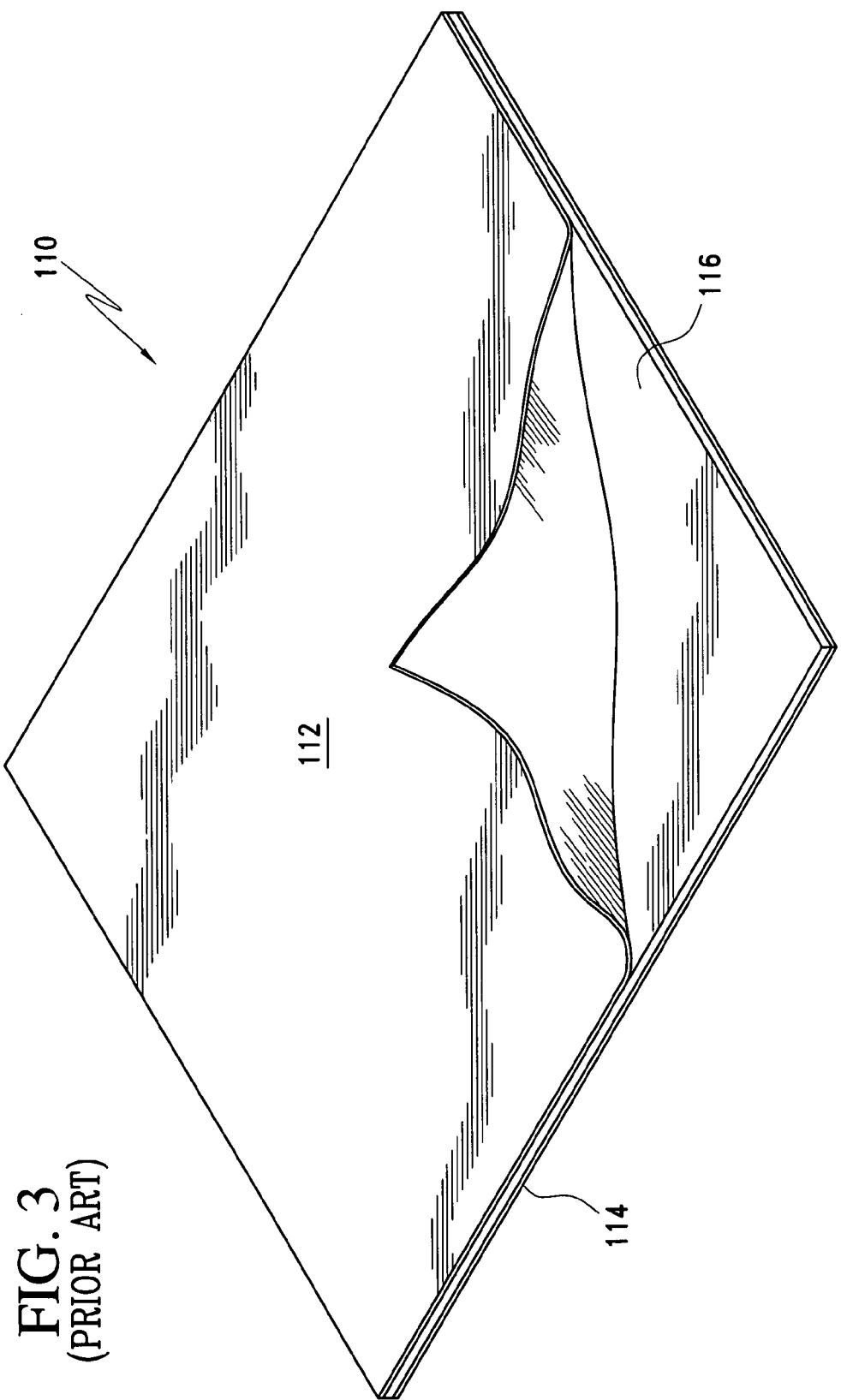
FIG. 3 is a photograph of the second, conventional PRIOR ART tier sheet, as disclosed within FIG. 2, disclosing the delamination of one of the outer layers of the second conventional, PRIOR ART tier sheet from the inner or core layer of the second, conventional PRIOR ART tier sheet.

Referring now to the drawings, and more particularly to FIG. 4 thereof, a new and improved tier sheet, constructed in accordance with the principles and teachings of the present invention, is disclosed and is generally indicated by the reference character 210. It is noted that the primary structural component parts of the new and improved tier sheet 210 which correspond to similar or corresponding component parts of the first and second tier sheets 10,110, which were respectively disclosed within FIGS. 1 and 2, will be denoted by means of similar or corresponding reference characters except that they will be within the 200 series. More particularly, it is seen that the new and improved tier sheet 210 comprises a three-layer laminated extrusion comprising first and second, oppositely disposed outer layers 212,214 which are fabricated from a suitable polypropylene homopolymer, and an inner or core layer 216 which comprises a suitable polypropylene copolymer that is blended with a suitable elastomer which is selected from the group comprising SANTOPRENE®, KRATON®, ethyl vinyl acetate (EVA), and a thermoplastic olefin (TPO). The percentage of the elastomer material, by weight, incorporated within the inner or core layer 216, may vary anywhere within the range of two percent to twenty-five percent (2.00-25.00%). Accordingly, by effectively incorporating the elastomer into the inner or core layer 216 of the three-layer laminated extrusion comprising the tier sheet 210, the tier sheet 210 is provided with the desired or requisite amount of softness, elasticity, and resiliency so as to permit the multiplicity of cans to, in effect, form sufficiently large or deep impressions or depressions within the upper and lower tier sheets as the different tiers or layers of tier sheets and cans are disposed upon the transportation pallet within the aforenoted tiered array comprising the palletized load such that movement of the individual cans with respect to the upper and lower tier sheets will effectively be restricted and prevented.

In addition, by effectively incorporating the elastomer into the inner or core layer 216 of the three-layer laminated extrusion comprising the tier sheet 210, the tier sheet 210 is provided with the desired or requisite amount of softness, elasticity, and resiliency such that after the cans are removed from the tier sheets 210, the laminated structure comprising each tier sheet 210 can dimensionally recover such that the depressions and impressions, previously formed within each tier sheet 210, will effectively disappear so as to thereby enable each tier sheet 210 to be readied for use with respect to supporting and restraining new or additional sets of cans in connection with the formation of subsequent palletized loads. Furthermore, as a result of forming the three-layer tier sheet 210 as an integrally formed co-extrusion laminate, the outer layers 212,214 will not readily delaminate from, or with respect to, the inner or core layer 216, and still further, in view of the co-extrusion process, the edge portions of the three-layer laminate are effectively sealed such that the three-layer tier sheet laminate 210 will not readily absorb moisture.

Thus, it may be seen that in accordance with the teachings and principles of the present invention, there has been disclosed and described a new and improved tier sheet which comprises a three-layer laminated extrusion comprising outer layers of a suitable polypropylene homopolymer, and an inner or core layer comprising a suitable polypropylene copolymer blended with a suitable elastomer selected from the group comprising SANTOPRENE®, KRATON®, ethyl vinyl acetate (EVA), and a thermoplastic olefin (TPO). The percentage of the elastomer material, by weight, incorporated within the inner or core layer 216, may vary anywhere within the range of two percent to twenty-five percent (2.00-25.00%). Accordingly, by effectively incorporating the elastomer into the inner or core layer of the three-layer laminated extrusion, the tier sheet is provided with the desired or requisite amount of softness, elasticity, and resiliency so as to permit the multiplicity of cans to, in effect, form sufficiently large or deep impressions or depressions within the upper and lower tier sheets as the different tiers or layers of tier sheets and cans are disposed upon the transportation pallet within the aforenoted tiered array comprising the palletized load such that movement of the individual cans with respect to the upper and lower tier sheets will effectively be restricted and prevented.

In addition, by effectively incorporating the elastomer into the inner or core layer of the three-layer laminated extrusion, the tier sheet is provided with the desired or requisite amount of softness, elasticity, and resiliency such that after the cans are removed from the tier sheets, the laminated structure comprising each tier sheet can dimensionally recover whereby the depressions and impressions, previously formed within each tier sheet, will effectively disappear so as to thereby enable each tier sheet to be readied for use with respect to supporting and effectively restraining new or additional sets of cans in connection with the formation of subsequent palletized loads. Furthermore, as a result of forming the three-layer tier sheet as an integrally formed co-extrusion laminate, which effectively comprises molten materials during the extrusion process, the outer layers will not readily delaminate from, or with respect to, the inner or core layer, and still further, in view of the aforenoted co-extrusion process comprising the molten materials, the edge portions of the three-layer laminate are effectively sealed such that the three-layer tier sheet laminate will not readily absorb moisture.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. In combination, a tier sheet, adapted for interdisposition between stacked layers of a plurality of cans disposed upon a pallet so as to form, with said stacked layers of said plurality of cans, a palletized load, consisting of:
   a plurality of cans arranged in stacked layers upon a pallet; and
   a tier sheet adapted for interdisposition between said stacked layers of said plurality of cans disposed upon said pallet so as to form, with said stacked layers of said plurality of cans, said palletized load,
   said tier sheet consisting of only a three-layer laminate structure consisting of only a pair of oppositely disposed outermost layers, consisting of a polypropylene homopolymer, and an inner core layer, interposed between said pair of oppositely disposed outermost layers, consisting of a blend of a polypropylene copolymer and an elastomer,
   wherein said tier sheet, consisting of only said three-layer laminate structure consisting of only said pair of oppositely disposed outermost layers consisting of a polypropylene homopolymer, and said inner core layer, interposed between said pair of oppositely disposed outermost layers and consisting of a blend of a polypropylene copolymer and an elastomer, exhibits a sufficient amount of softness, elasticity, and resiliency so as to permit said cans to form sufficiently deep impressions and depressions within said oppositely disposed outermost layers of said tier sheet so as to effectively restrain movements of said cans while said cans are disposed upon said tier sheet within said palletized load, and yet permit said tier sheet to dimensionally recover, after said cans are removed therefrom, whereby said impressions and depressions will effectively disappear such that said tier sheet will be ready for subsequent use in connection with the stacking of new cans within a new palletized load.

2. The tier sheet as set forth in claim 1, wherein:
said elastomer incorporated within said inner core layer of said tier sheet is selected from the group consisting of SANTOPRENE®, KRATON®, ethyl vinyl acetate (EVA), and a thermoplastic olefin (TPO).

3. The tier sheet as set forth in claim 1, wherein:
the percentage of said elastomer, by weight, incorporated within said inner core layer of said tier sheet, is within the range of two percent to twenty-five percent (2.00-25.00%) of said inner core layer.

4. The tier sheet as set forth in claim 1, wherein:
said three-layer tier sheet, comprising said pair of oppositely disposed outermost layers and said inner core layer, comprises an integral co-extruded structure such that said pair of oppositely disposed outer layers cannot delaminate with respect to said inner core layer.

5. The tier sheet as set forth in claim 1, wherein:
said three-layer tier sheet, comprising said pair of oppositely disposed outer layers and said inner core layer, comprises an integral co-extruded structure such that peripheral edge portions of said three-layer tier sheet are effectively sealed whereby said three-layer tier sheet will not readily absorb moisture.

6. In combination, a tier sheet, adapted for interdisposition between stacked layers of a plurality of cans disposed upon a pallet so as to form, with said stacked layers of said plurality of cans, a palletized load, consisting of:

a plurality of cans arranged in stacked layers upon a pallet; and a tier sheet adapted for interdisposition between said stacked layers of said plurality cans disposed upon said pallet so as to form, with said stacked layers of said plurality of cans, said palletized load, said tier sheet consisting of only a three-layer laminate structure consisting of only a pair of oppositely disposed outermost layers, consisting of a polypropylene homopolymer, and an inner core layer interposed between said pair of oppositely disposed outermost layers and consisting of a blend of a polypropylene copolymer and an elastomer, wherein said tier sheet, consisting of only said three-layer laminate structure consisting of only said pair of oppositely disposed outermost layers and said inner core layer interposed between said pair of oppositely disposed outermost layers, further consists of an integral co-extruded laminate structure such that said pair of oppositely disposed outer layers, consisting of a polypropylene homopolymer, will not delaminate with respect to said inner core layer consisting of a blend of a polypropylene copolymer and an elastomer.

7. The tier sheet as set forth in claim 6, wherein:

said elastomer incorporated within said inner core layer of said tier sheet is selected from the group consisting of SANTOPRENE®, KRATON®, ethyl vinyl acetate (EVA), and a thermoplastic olefin (TPO).

8. The tier sheet as set forth in claim 6, wherein:

the percentage of said elastomer, by weight, incorporated within said inner core layer of said tier sheet, is within the range of two percent to twenty-five percent (2.00-25.00%) of said inner core layer.

9. The tier sheet as set forth in claim 6, wherein:

said three-layer tier sheet, comprising said pair of oppositely disposed outermost layers and said inner core layer, comprises an integral co-extruded structure such that peripheral edge portions of said three-layer tier sheet are effectively sealed whereby said three-layer tier sheet will not readily absorb moisture.

10. The tier sheet as set forth in claim 6, wherein:

said three-layer tier sheet, comprising said pair of oppositely disposed outermost layers and said inner core layer, exhibiting a sufficient amount of softness, elasticity, and resiliency so as to permit the cans to form sufficiently deep impressions and depressions within said oppositely disposed outer layers of said tier sheet so as to effectively restrain movements of the cans while the cans are disposed upon said tier sheet within a palletized load, and yet permit said tier sheet to dimensionally recover, after the cans are removed therefrom, whereby said impressions and depressions will effectively disappear such that said tier sheet will be ready for subsequent use in connection with the stacking of new cans within a new palletized load.

11. The tier sheet as set forth in claim 6, wherein:

said three-layer tier sheet, comprising said pair of oppositely disposed outer layers and said inner core layer, for exhibiting a sufficient amount of softness, elasticity, and resiliency so as to permit the cans to form sufficiently deep impressions and depressions within said oppositely disposed outer layers of said tier sheet so as to effectively restrain movements of the cans while the cans are disposed upon said tier sheet within a palletized load, and yet permit said tier sheet to dimensionally recover, after the cans are removed therefrom, whereby said impressions and depressions will effectively disappear such that said tier sheet will be ready for subsequent use in connection with the stacking of new cans within a new palletized load.

12. In combination, a tier sheet, adapted for interdisposition between stacked layers of a plurality of cans disposed upon a pallet so as to form, with said stacked layers of said plurality of cans, a palletized load, consisting of:

a plurality of cans arranged in stacked layers upon a pallet; and a tier sheet adapted for interdisposition between said stacked layers of said plurality of cans disposed upon said pallet so as to form, with said stacked layers of said plurality of cans, said palletized load, said tier sheet consisting of only a three-layer laminate structure consisting of only a pair of oppositely disposed outermost layers, consisting of a polypropylene homopolymer, and an inner core layer interposed between said pair of oppositely disposed outermost layers and consisting of a blend of a suitable polypropylene copolymer and an elastomer;

wherein said tier sheet, consisting of only said three-layer laminate structure consisting of only said pair of oppositely disposed outermost layers and said inner core layer interposed between said pair of oppositely disposed outermost layers, further consists of an integral co-extruded laminate structure such that peripheral edge portions of said three-layer tier sheet are effectively sealed whereby said three-layer tier sheet will not readily absorb moisture.

13. The tier sheet as set forth in claim 12, wherein:

said three-layer laminated tier sheet, comprising said pair of oppositely disposed outermost layers and said inner core layer, comprises an integral co-extruded structure such that said pair of oppositely disposed outer layers cannot delaminate with respect to said inner core layer.

14. The tier sheet as set forth in claim 12, wherein:

said elastomer incorporated within said inner core layer of said tier sheet is selected from the group consisting of SANTOPRENE®, KRATON®, ethyl vinyl acetate (EVA), and a thermoplastic olefin (TPO).

15. The tier sheet as set forth in claim 12, wherein:

the percentage of said elastomer, by weight, incorporated within said inner core layer of said tier sheet, is within the range of two percent to twenty-five percent (2.00-25.00%) of said inner core layer.

* * * * *